United States Patent [19]

Wakatani

[11] Patent Number: 5,715,457
[45] Date of Patent: Feb. 3, 1998

[54] MULTIPROCESSOR SYSTEM FOR DETERMINING ASSIGNMENT OF TASK IN VIEW OF ACCESS TIME TO STORAGE RESOURCE

[75] Inventor: Akiyoshi Wakatani, Hirakata, Japan

[73] Assignee: Matsushita Electtic Industrial, Osaka-fu, Japan

[21] Appl. No.: 726,057

[22] Filed: Oct. 3, 1996

[30] Foreign Application Priority Data

Oct. 6, 1995 [JP] Japan ................................. 7-259766

[51] Int. Cl.⁶ .............................................. G06F 9/46
[52] U.S. Cl. ........................ 395/675; 395/672; 395/673; 364/281.4; 364/281.8
[58] Field of Search .................................. 395/670, 672, 395/675; 364/281.4, 281.8, 281, 281.6, 281.7

[56] References Cited

U.S. PATENT DOCUMENTS

| | | | |
|---|---|---|---|
| 4,126,895 | 11/1978 | Weemdes et al. | 395/675 |
| 4,495,562 | 1/1985 | Yamaji et al. | 395/675 |
| 4,633,387 | 12/1986 | Hartung et al. | 395/675 |
| 5,053,950 | 10/1991 | Naganuma et al. | 395/675 |
| 5,155,858 | 10/1992 | De Bruler et al. | 395/800 |
| 5,241,677 | 8/1993 | Naganuma et al. | 395/675 |
| 5,361,362 | 11/1994 | Benkeser et al. | 395/672 |
| 5,437,032 | 7/1995 | Wolf et al. | 395/673 |

Primary Examiner—Lucien U. Toplu
Assistant Examiner—Majid A. Banankhah
Attorney, Agent, or Firm—Price, Gess & Ubell

[57] ABSTRACT

A multiprocessor system having at least two processing elements, each of which includes a processor and a storage resource, connected via a network, each processor comprising: a task generation device for generating a task which includes information concerning access frequency to the storage resource on each processing element; a predicted termination time collection device for collecting predicted termination time from any processing element, the predicted termination time being time to terminate execution of at least one task assigned to the processing element; an estimated access time storage device for storing time estimated for accessing the storage resource on the processing element and time estimated for accessing the storage resource on any processing element via the network; a processing element determination device for determining which of the processing elements should execute the generated task based on the predicted termination time, the information concerning access frequency and the access time; a task transmission device for transmitting the generated task to the processing element which should execute the task; and a task execution device for executing one of the task generated on the processing element and the task transmitted from any processing element.

11 Claims, 8 Drawing Sheets

MULTIPROCESSOR SYSTEM FOR DETERMINING ASSIGNMENT OF TASK IN VIEW OF ACCESS TIME TO STORAGE RESOURCE

BACKGROUND OF THE INVENTION

(1) Field of the Invention

The present invention relates to a multiprocessor system in which processing elements, each including a storage resource, are connected via a network.

(2) Description of the Related Art

In order to improve efficiency of a multiprocessor system, it is important to distribute loads when tasks are generated so that all processors are assigned the same amount of loads. There are two methods of distribution. One is static load distribution, which is to determine which processor should be assigned a newly generated task when a program is created or compiled. The other is dynamic load distribution, which is to do the same when the new task is generated. In the multiprocessor system, it is often likely that execution time and number of tasks are uncertain until they are actually generated. Therefore, dynamic load distribution is indispensable.

The following "least load method" has been widely used as the conventional dynamic load distribution. When a task is generated, the processor having the least load is detected and is assigned the task. However, this least load method cannot assign the task to the processor effectively when the task requires frequent access to storage resources such as files distributed to each processing element.

SUMMARY OF THE INVENTION

It is an object of the present invention to provide a multiprocessor system for distributing loads effectively based on the characteristics of the tasks.

Another object of the present invention is to provide a multiprocessor system for distributing loads effectively in view of access frequency of each task to the storage resource.

A further object of the present invention is to provide a multiprocessor system for distributing loads effectively, using the total of access time to the storage resource and execution time for the task by the processor.

The above objects can be achieved by the following features.

(1) A multiprocessor system having at least two processing elements, each of which includes a processor and a storage resource, connected via a network, each processor comprises: a task generation device for generating a task which includes information concerning access frequency to the storage resource on each processing element; a predicted termination time collection device for collecting predicted termination time from any processing element, the predicted termination time being time to terminate execution of at least one task assigned to the processing element; an estimated access time storage device for storing time estimated for accessing the storage resource on the processing element and time estimated for accessing the storage resource on any processing element via the network; a processing element determination device for determining which of the processing elements should execute the generated task based on the predicted termination time, the information concerning access frequency and the access time; a task transmission device for transmitting the generated task to the processing element which should execute the task; and a task execution device for executing one of the task generated on the processing element and the task transmitted from any processing element.

(2) The processing element determination device may include: a calculation unit for carrying out a predetermined calculation so as to determine to which processing element the generated task should be assigned for the most effective load distribution based on the predicted termination time, the information concerning access frequency and the access time; and a determination unit for determining which processing element should be assigned the generated task based on the calculation.

(3) N processing elements may be connected, n being an integer, the calculation unit may calculate $O_i=T_i+F_i*(Al-Ar)$ for ith processing element; i being from 1 to n; $F_i$ being the access frequency to the storage resource on the ith processing element; $T_i$ being the predicted termination time of ith processing element; Ar being the estimated access time to the storage resource on any processing element via the network; and Al being the estimated access time to the storage resource on itself, and the determination unit may determine that the generated task should be transmitted to the processing element having the lowest $O_i$.

(4) The generated task may include information on predicted execution time needed for execution of the task and each processor may include an execution time control device for obtaining the predicted termination time of at least one task assigned to the processor based on the information on the predicted execution time.

(5) The predicted termination time collection device may include: a predicted termination time request unit for requesting any processing element to transmit its predicted termination time; and a predicted termination time reception unit for receiving the predicted termination time transmitted from any processing element.

(6) The processor may include: a predicted termination time request reception device for receiving the request of transmission of the predicted termination time; and a predicted termination time transmission device for transmitting the predicted termination time obtained by its execution time control device in response to the request of transmission.

(7) The information on the predicted execution time may be determined beforehand based on contents in a task text unit included in the task.

(8) Each processor may include: an execution time record storage device for storing a record of the execution time of the task assigned to the processor; and an execution time information change device for dynamically changing the information on the predicted execution time based on the record stored in the execution time record storage device.

(9) The information concerning the access frequency may be determined beforehand based on the contents in the task text unit included in the task.

(10) Each processor may include: an access frequency record storage device for storing a record of the access frequency of the task assigned to the processor; and an access frequency information change device for dynamically changing the information concerning the access frequency based on the record stored in the access frequency record storage device.

(11) In a multiprocessor system having at least two processing elements, each of which may include a processor and a storage resource, connected via a network, the processor comprises: a task generation device for generating a task which includes information concerning access frequency to the storage resource on each processing element; a predicted termination time collection device for collecting predicted termination time from any processing element, predicted termination time being time to terminate execution of at least one task assigned to the processing element; an estimated access time storage device for storing time estimated for accessing the storage resource on the processing element and time estimated for accessing the storage resource on any processing element via the network; and a processing element determination device for determining which of the processing elements should execute the generated task based on the predicted termination time, the information concerning access frequency and the access time.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The multiprocessor system of the embodiment of the present invention can be explained as follows by means of diagrams.

Figure 1:
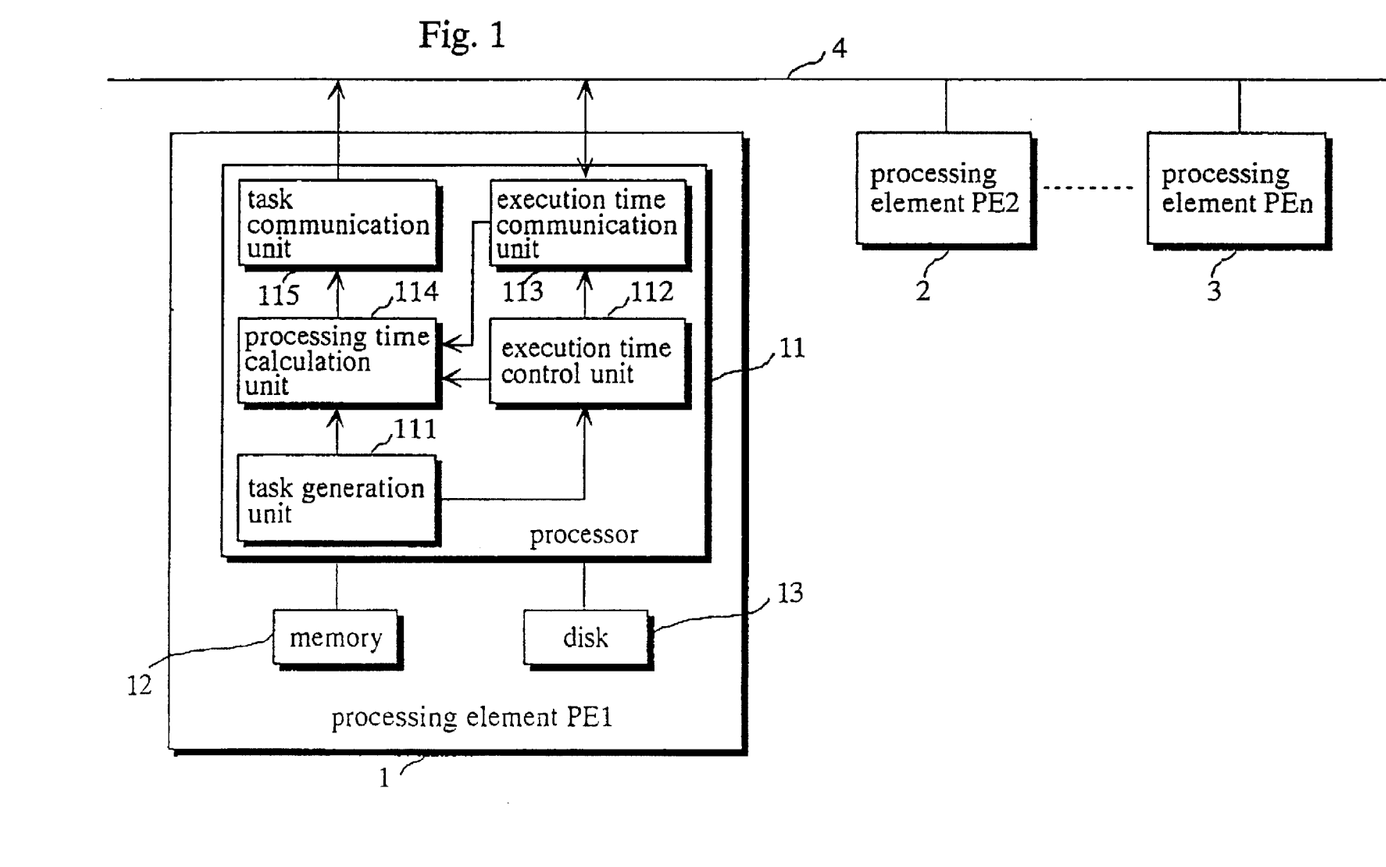
FIG. 1 is a block diagram showing construction of the multiprocessor system of the present invention.

FIG. 1 shows a block diagram showing construction of the multiprocessor system of the present invention. PE1 (processing element 1) consists of processor 11 for executing tasks or an OS (operating system), memory 12 and disk 13. Other PEs (PE2, . . . PEn) have the same construction. All the PEs are connected via network 4.

Processor 11 comprises task generation unit 111, execution time control unit 112, execution time communication unit 113, processing time calculation unit 114 and task communication unit 115.

Task generation unit 111 generates a task. Construction of the task will be explained later.

Execution time control unit 112 controls execution time of the tasks assigned to processor 11 and transmits predicted termination time of the tasks in response to a request transmitted from one of the other processors via execution time communication unit 113.

Execution time communication unit 113 requests other PEs to transmit the predicted termination time of the tasks assigned to their processors, respectively, when the task is generated. And execution time communication unit 113 relays the predicted termination time of the tasks assigned to the processor in response to the request from one of the other processors.

Processing time calculation unit 114 calculates overhead of all the tasks assigned to each processor based on the predicted termination time of the tasks assigned to processors on other PEs, the predicted termination time of the task assigned to processor 11 and the task generated from task generation unit 111. And processing time calculation unit 114 determines a processor to be assigned the task so as to achieve the best efficiency.

Task communication unit 115 transmits the generated task to the processor determined by processing time calculation unit 114. And task communication unit 115 receives the task transmitted from one of the other processors, which will be stored in an execution queue on memory 12 and executed on processor 11.

Figure 2:
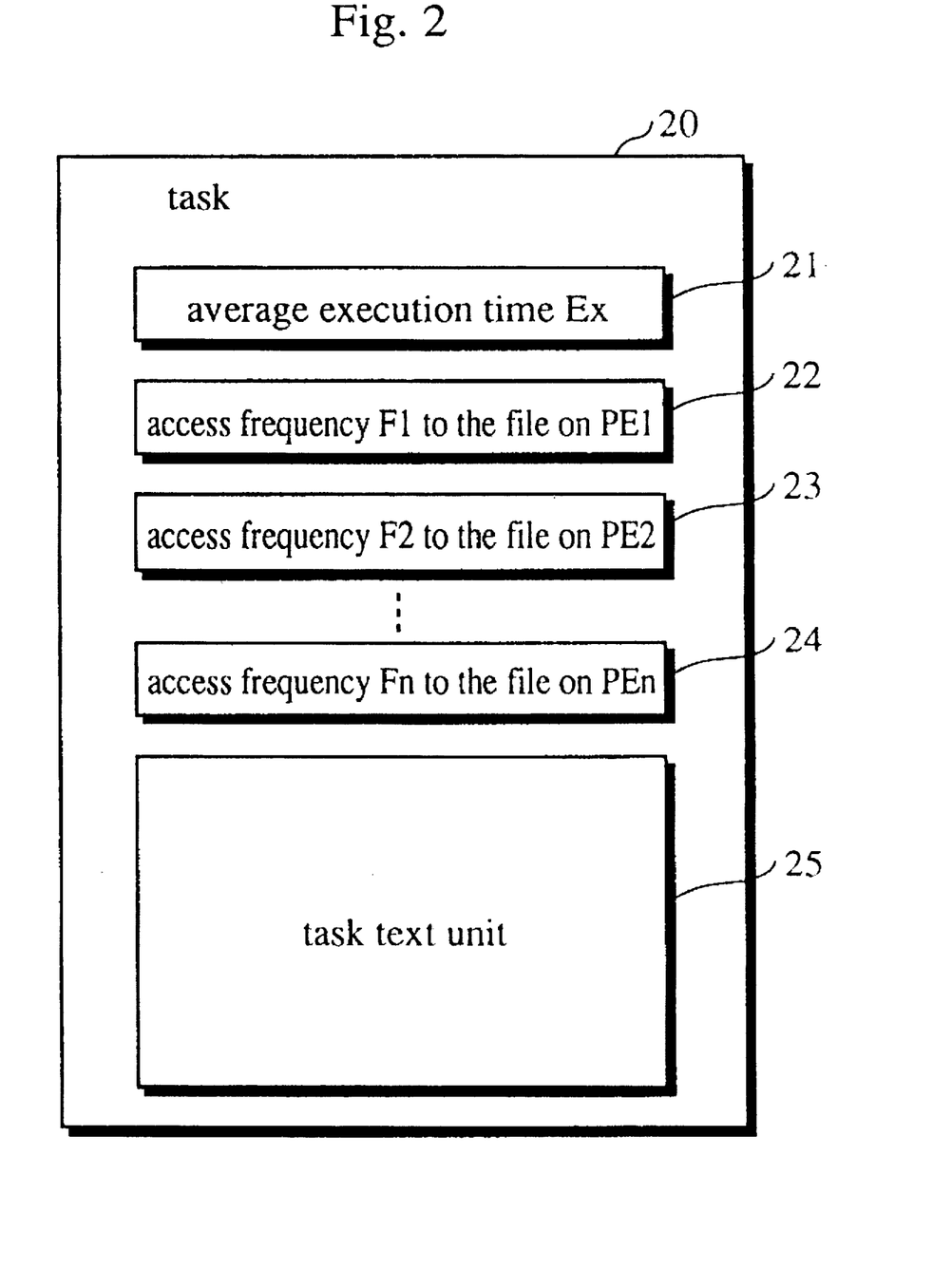
FIG. 2 shows construction of a task of the multiprocessor system of the present invention.
Figure 3:
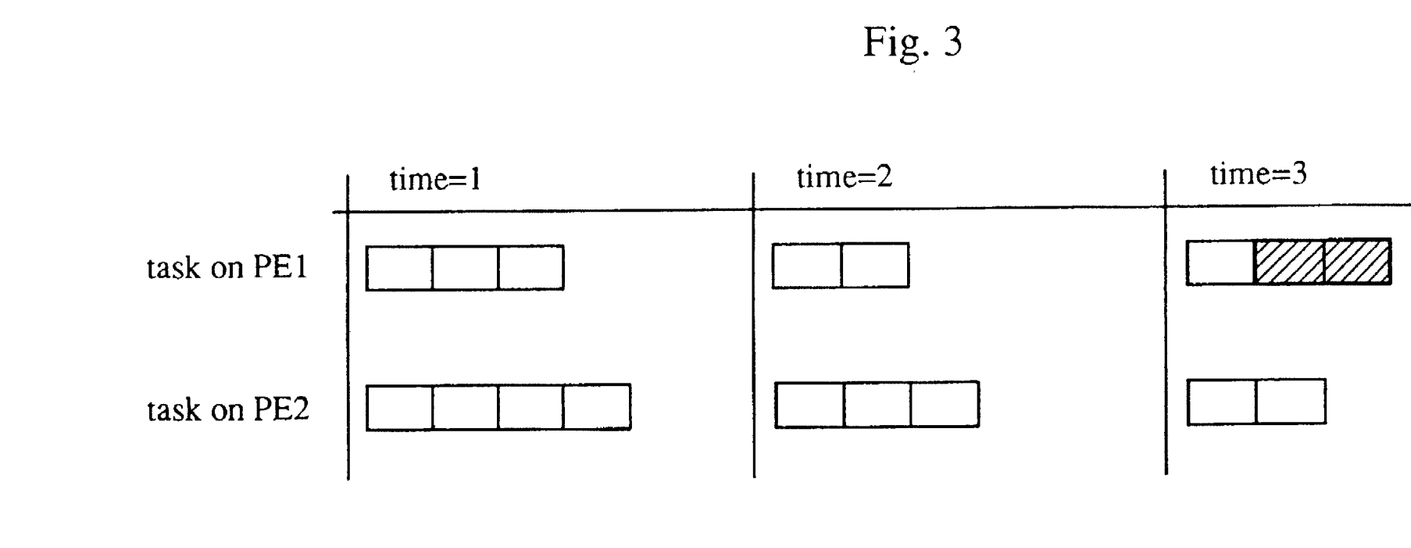
FIG. 3 shows a concrete example of assignment of tasks in the multiprocessor system of the present invention.

FIG. 2 shows construction of the task generated on each processor in the multiprocessor system of the present invention. Task 20 comprises: average execution time Ex21 which shows average execution time of the task on the processor; file access frequencies 22, 23 and 24 which show which disk stores a file to be accessed; and task text unit 25 which shows contents of the task.

In order to calculate average execution time Ex21, the method disclosed in Japanese Laid-open Patent Application No. 4-320536 can be used. First, a flow of execution of the task is predicted from a list of machine language or assembler which was created by compiling a source program. And an execution request cycle number for executing the flow is handled as average execution time.

The following method is for calculating file access frequency: the flow of execution of the task is predicted; the number of file access requests in the flow is counted; and the file access frequency is estimated from the position of the disk including the file to be accessed. Specifically, the file access frequency is stored as the number of accesses to the disk on each PE. In FIG. 2, as access frequency F1 to the file on PE1 (reference FIG. 22), access frequency of the task to the disk on PE1 is stored. The same thing can be said to file access frequency F2 to the file on PE2 (23) and file access frequency Fn to the file on PEn (24).

In the present embodiment, information on the average execution time and file access frequency is described statically in the task by referring to necessary information at the time of compiling. Instead, the information can be generated by referring to necessary information when the task is generated or it can be dynamically updated when the task is executed based on the record of the execution time of the task assigned to the processor.

Figure 5:
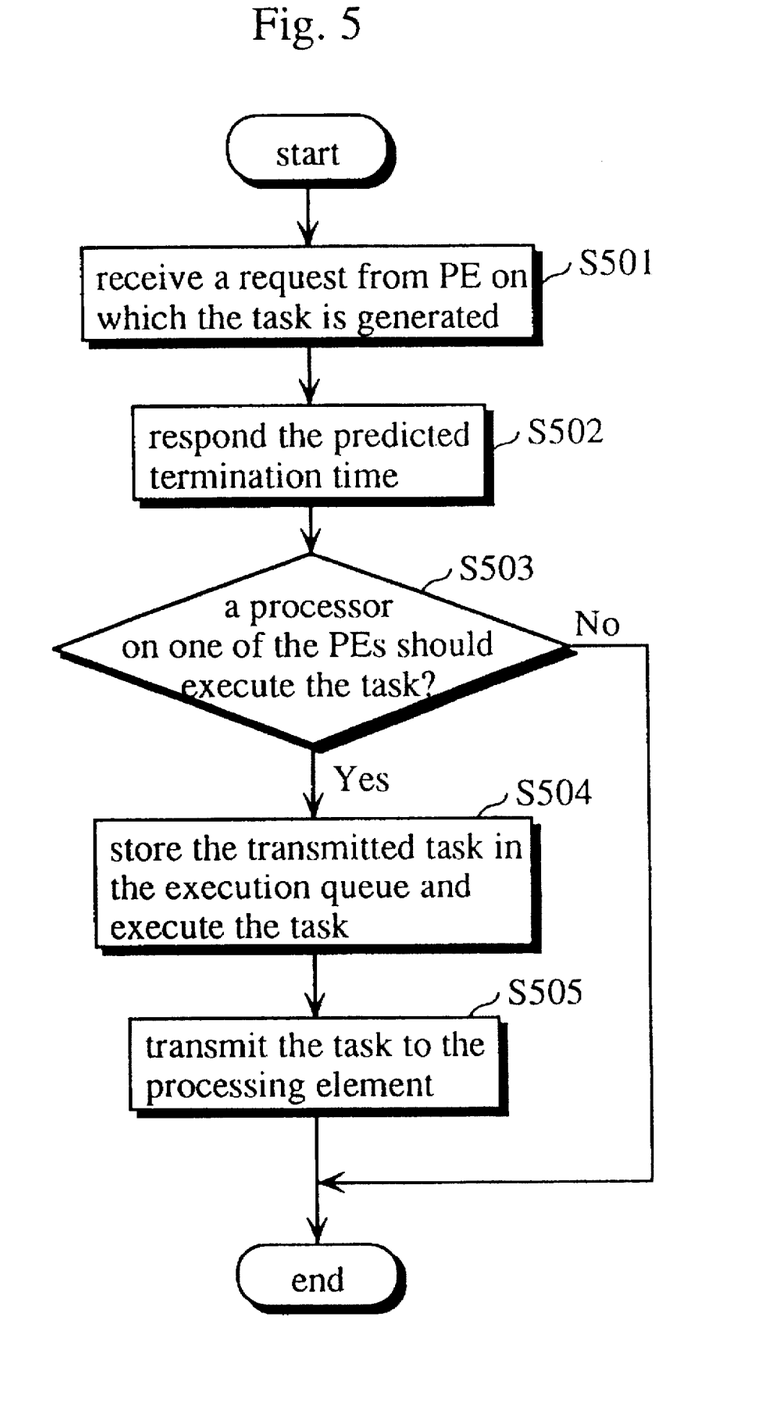
FIG. 5 is a flowchart showing operations of processors which did not generate the task in the multiprocessor system of the present-invention.

On each processor, a plurality of tasks and an OS for controlling the tasks are executed. The OS schedules generation, placement/deletion and execution of the tasks. Moreover, the OS communicates with other PEs connected via network 4 and controls the predicted termination time of all the tasks assigned to the processor. FIG. 5 shows an example. When time=1, a task of three unit time is assigned to PE1. When time=2, as the processing for one unit time is completed, the predicted termination time of the task is two unit time. When time=3, as a task of two unit time is assigned to PE1, the predicted termination time is three unit time. Execution time control unit 112 always controls the predicted termination time. In the case os PE2, as a new task is not generated, four unit time at time=1 changes to two unit time at time=3.

Moreover, the OS communicates with other PEs connected via network 4 and collects predicted termination time of the tasks assigned to each of their processors when the task is generated. Specifically, execution time communication unit 113 requests other PEs to transmit each of their predicted termination time of the tasks. In response to that, execution time communication units of processors in other PEs transmit each of their predicted termination time controlled by their processing time control unit.

Here, "$T_i$" (i=1–n) is set as the predicted termination time of all the tasks on each processor. "$F_i$" (i=1–n) is set as file access frequency on each PE. This is shown in FIG. 2, in which a task stores file access frequencies F1-Fn on PE1-PEn, respectively. "Ar" is set as a unit time for accessing the disk on other PEs via network 4. "Al" is set as a unit time for accessing the disk on the PE on which the task is executed. Processing time calculation unit 114 calculates the following.

$$O_i = T_i + F_i * (Al - Ar) \quad (1)$$

Processing time calculation unit 114 finds PE having the lowest "$O_i$" and assigns the generated task to that PE. Task communication unit 115 transmits the new task to that PE.

An optimal assignment can be realized in the above mentioned way. Equation (1) is based on the following equations (2) and (3). When the Generated task is assigned to PEi, total processing time "$E_i$" of the task can be expressed as follows, using average execution time "Ex" included in the task.

$$\begin{aligned} E_i &= Ex + Ar*F1 + Ar*F2 + \ldots Al*F_i \ldots + Ar*Fn \quad (2) \\ &= Ex + Ar*\Sigma F_i - (Ar*F_i + Al*F_i) \end{aligned}$$

And "$E_i + T_i$" becomes the predicted termination time of the new task after the assignment.

$$\begin{aligned} E_i + T_i &= (Al - Ar)*F_i + \quad (3) \\ & \quad Ex + Ar*F1 + \ldots Ar*F_i \ldots + Ar*Fn \\ &= T_i + (Al - Ar)*F_i + Ar*\Sigma F_i \end{aligned}$$

In the present embodiment, "Ar" is constant as the average value is used, so "$Ar*\Sigma F_i$" is constant regardless of "i". Therefore, calculating only "$O_i$" and finding the lowest "$O_i$" makes it possible to find PE having the least load in view of time needed for accessing the file.

It will be apparent from the following explanations why the present invention is superior to the conventional least load method.

When the generated task does not require file access at all, results of the conventional least load method and the method of the present invention become the same. In other words, as the second term of equation (1) becomes nullified, the task is assigned to the PE having the lowest "$T_i$".

When the generated task requires file access and file access unit time is the same regardless of local access and remote access, "Ar" and "Al" in equation (1) become equal. So, second term of equation (1) becomes nullified. Eventually, the result of the assignment becomes the same with the one of the conventional least load method.

When the generated task requires file access and file access unit time depends on local access and remote access, the second term of equation (1) works. In other words, in the conventional least load method, file access was ignored. Only task loads of the processor is taken into consideration. Therefore, as the difference between file access unit time in local access and that in remote access widens, the conventional least load method cannot assure effective assignment of the task loads, whereas the method of the present invention results in success.

The processing of the processors in the multiprocessor system of the present invention can be explained as follows. The processors are divided into the following two types: the processor on the PE on which the task is generated; and the processors on rest of the PEs.

Figure 4:
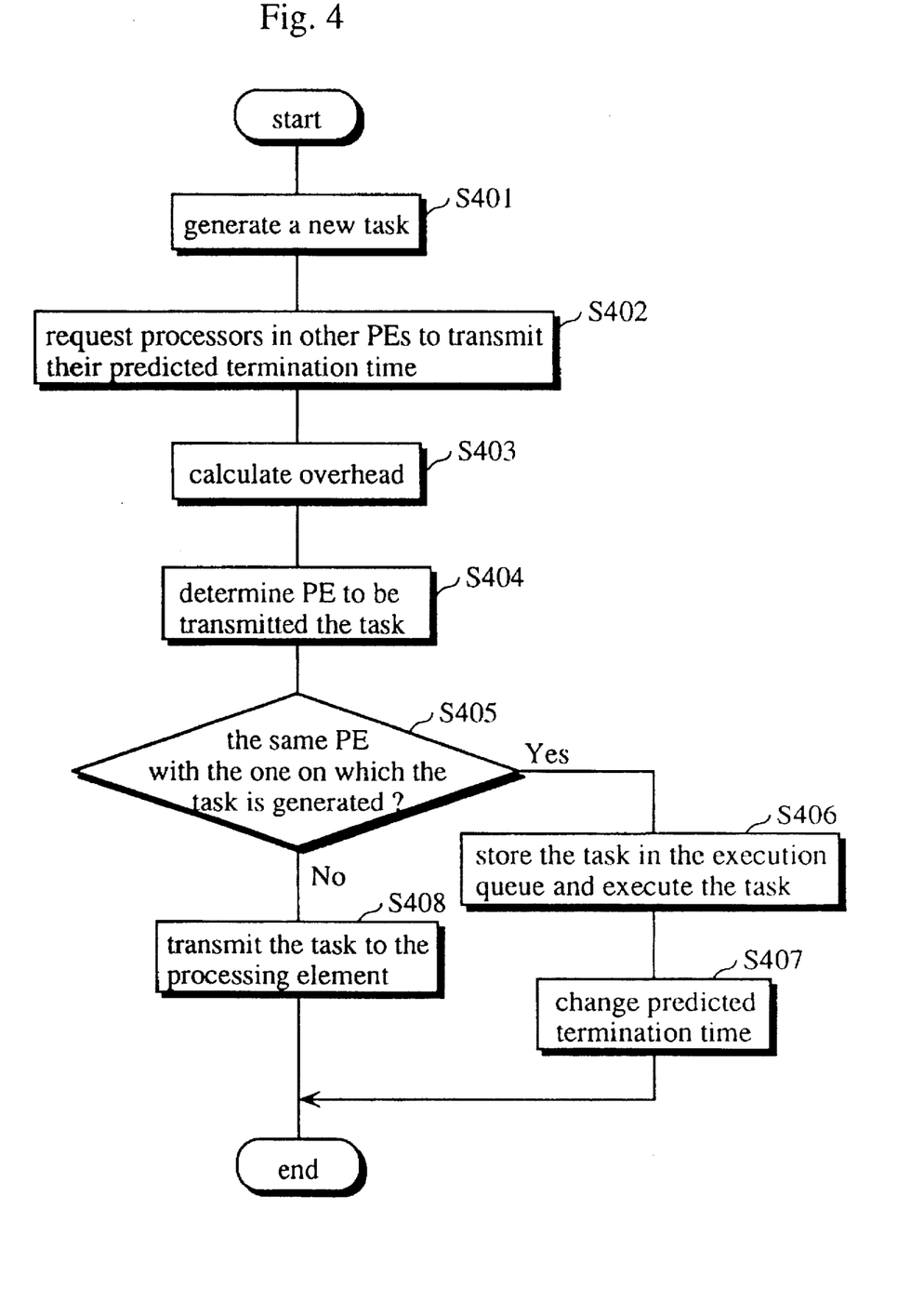
FIG. 4 is a flowchart showing operations of a processor which generated a task in the multiprocessor system of the present invention.

FIG. 4 is a flowchart showing processing of the processor on the PE on which the new task is generated.

When task generation unit 111 generates the new task (Step 401), execution time communication unit 113 requests processors on other PEs to transmit their predicted termination time, respectively (Step 402). After that, processing time calculation unit 114 calculates overhead based on the predicted termination time of the tasks from other processors, the predicted termination time of the task on its processor 11 and information included in the generated task (Step 403). Based on the overhead, processing time calculation unit 114 determines PE having the lowest "$O_i$" in equation (1) (Step 404), and if that PE is the same with the PE on which the task is generated (Step 405: Yes), processing time calculation unit 114 stores the newly generated task in the execution queue and executes the task (Step 406).

Moreover, execution time control unit 112 changes the predicted termination time, using average execution time Ex included in the generated task.

If the generation and execution of the task do not occur on the same PE (Step 405: No), task communication unit 115 transmits the new task.

FIG. 5 is a flowchart showing processing of the processors on rest of the PEs.

Each PE starts operations on receiving the request from PE on which the task is generated (Step 501). In other words, in response to the request of transmission of the predicted termination time, the PEs transmit the predicted termination time, respectively (Step 502). After that, if it is determined that a processor in one of the PEs should execute the generated task (Step 503: Yes), the OS on that processor stores the transmitted task in the execution queue and executes the task (Step 504) and changes the predicted termination time (Step 505).

The following explanation is on concrete operations in the multiprocessor system of the present embodiment having the construction mentioned above.

Figure 6:
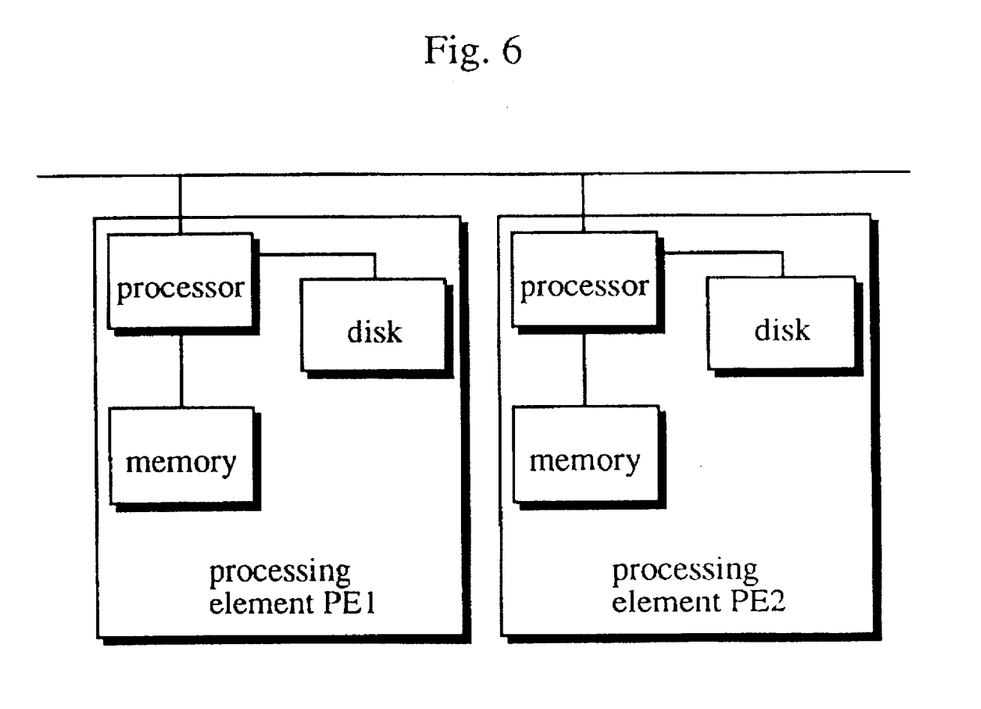
FIG. 6 shows construction of the multiprocessor system having two processing elements.
Figure 7:
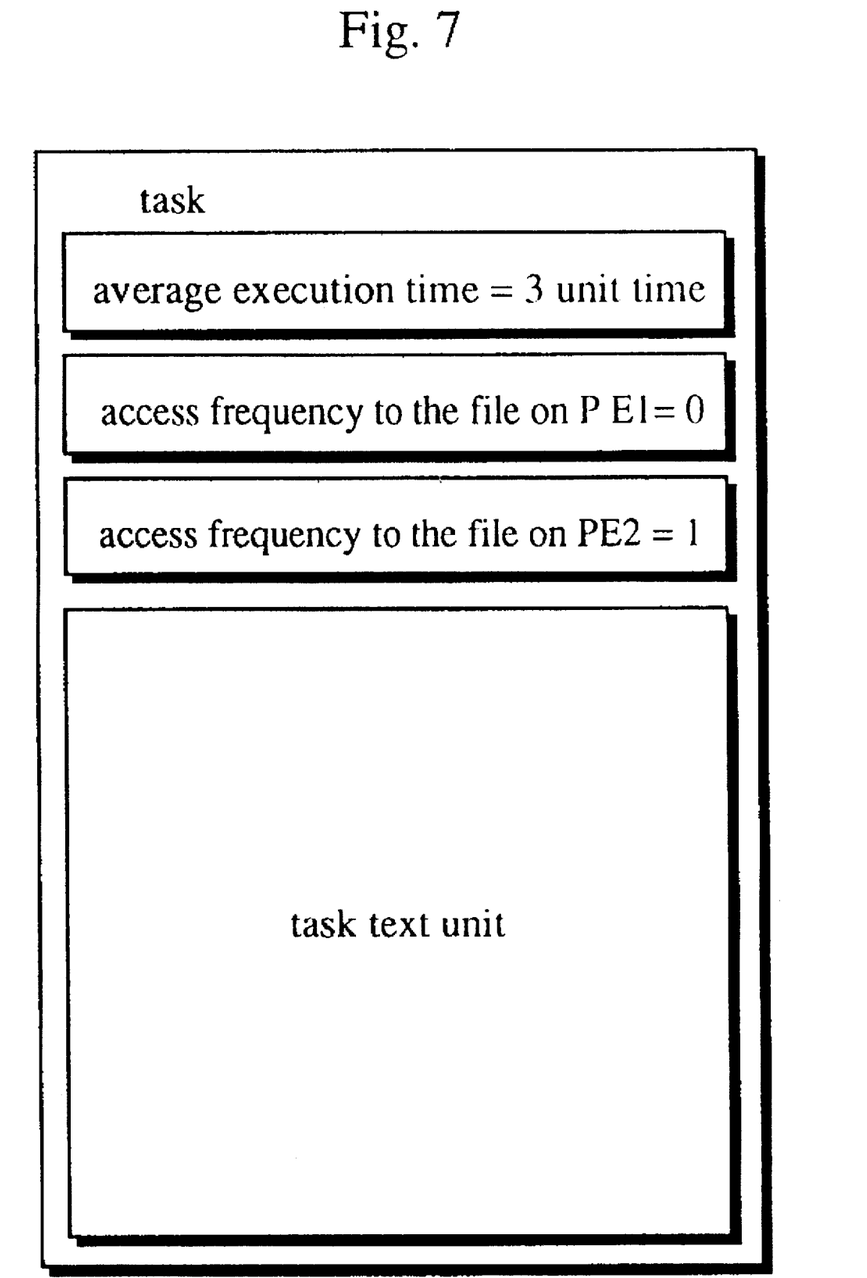
FIG. 7 shows construction of the task in the concrete example of the operations in the multiprocessor system of the present invention.

FIG. 6 shows a case in which there two PEs. FIG. 7 shows the task generated on PE1 in FIG. 6. In this case, the average execution time is three unit time and there is one file access to the disk on PE2. In order to access its own disk, each PE requires one unit time. In order to access the disks in other PEs via the network, they require three unit time.

Figure 8:
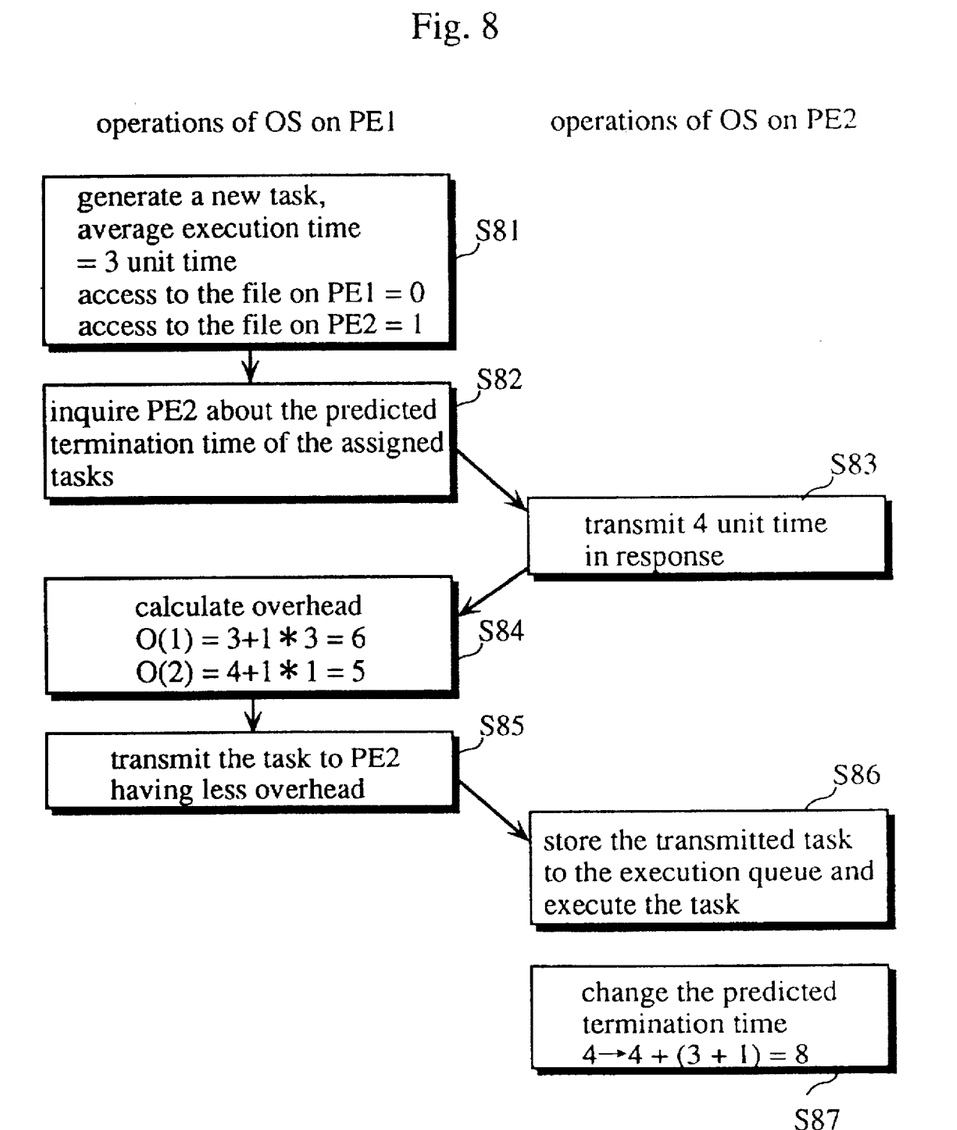
FIG. 8 is a flowchart showing operations in the multiprocessor system of the present invention.

FIG. 8 shows operations of the OS in the above mentioned case. First, the OS on PE1 generates the task (Step 81) and inquires other PEs (in this figure, PE2 only) about the their predicted termination time of the assigned tasks (Step 82).

The OS on PE2 posts four unit time to the OS on PE1 (Step 83). The OS on PE1 calculates "$O_i$" for each PE (Step 84). The lowest "$O_i$" is achieved by i=2. Therefore, the OS on PE1 transmits the task to PE2 (Step 85). The OS on PE2 schedules the transferred task (Step 86) and changes the predicted termination time (Step 87).

According to the above operations, it is possible to assign the generated task to one of the processors effectively, which was not possible by the conventional least load method.

There is no limit to the number of PEs. FIG. 8 can be applied to more PEs by setting Steps 81, 82, 84 and 85 as "operations of the OS on the PE on which the task is generated", Step 83 as "operations of the OSs on other PEs", Steps 86 and 87 as "operations of the OS on the PE which should execute the task".

Although the present invention has been fully described by way of examples with reference to the accompanying drawings, it is to be noted that various changes and modifications will be apparent to those skilled in the art. Therefore, unless such changes and modifications depart form the scope of the present invention, they should be construed as being included therein.

What is claimed is:

1. A multiprocessor system having at least two processing elements, each of which includes a processor and a storage resource, connected via a network, each processor comprising:

task generation means for generating a task which includes information concerning access frequency to the storage resource on each processing element;

predicted termination time collection means for collecting predicted termination time from any processing element, the predicted termination time being time to terminate execution of at least one task assigned to the processing element;

estimated access time storage means for storing time estimated for accessing the storage resource on the processing element and time estimated for accessing the storage resource on any processing element via the network;

processing element determination means for determining which of the processing elements should execute the generated task based on the predicted termination time, the information concerning access frequency and the access time;

task transmission means for transmitting the generated task to the processing element which should execute the task; and task execution means for executing one of the task generated on the processing element and the task transmitted from any processing element.

2. The multiprocessor system of claim 1, wherein the processing element determination means includes:

a calculation unit for carrying out a predetermined calculation so as to determine to which processing element the generated task should be assigned for the most effective load distribution based on the predicted termination time, the information concerning access frequency and the access time; and a determination unit for determining which processing element should be assigned the generated task based on the calculation.

3. The multiprocessor system of claim 2, wherein n processing elements are connected, n being an integer, the calculation unit calculates $O_i=T_i+F_i*(Al-Ar)$ for ith processing element: i being from 1 to n; $F_i$ being the access frequency to the storage resource on the ith processing element; $T_i$ being the predicted termination time of ith processing element; Ar being the estimated access time to the storage resource on any processing element via the network; and Al being the estimated access time to the storage resource on itself, and the determination unit determines that the generated task should be transmitted to the processing element having the lowest $O_i$.

4. The multiprocessor system of claim 1, wherein the generated task includes information on predicted execution time needed for execution of the task and each processor includes execution time control means for obtaining the predicted termination time of at least one task assigned to the processor based on the information on the predicted execution time.

5. The multiprocessor system of claim 4, wherein the predicted termination time collection means includes:

a predicted termination time request unit for requesting any processing element to transmit its predicted termination time; and a predicted termination time reception unit for receiving the predicted termination time transmitted from any processing element.

6. The multiprocessor system of claim 5, wherein the processor includes:

predicted termination time request reception means for receiving the request of transmission of the predicted termination time; and predicted termination time transmission means for transmitting the predicted termination time obtained by its execution time control means in response to the request of transmission.

7. The multiprocessor system of claim 4, wherein the information on the predicted execution time is determined beforehand based on contents in a task text unit included in the task.

8. The multiprocessor system of claim 7, wherein each processor includes:

execution time record storage means for storing a record of the execution time of the task assigned to the processor; and execution time information change means for dynamically changing the information on the predicted execution time based on the record stored in the execution time record storage means.

9. The multiprocessor system of claim 1, wherein the information concerning the access frequency is determined beforehand based on the contents in the task text unit included in the task.

10. The multiprocessor system of claim 9, wherein each processor includes:

access frequency record storage means for storing a record of the access frequency of the task assigned to the processor; and access frequency information change means for dynamically changing the information concerning the access frequency based on the record stored in the access frequency record storage means.

11. In a multiprocessor system having at least two processing elements, each of which includes a processor and a storage resource, connected via a network, the processor comprising:

task generation means for generating a task which includes information concerning access frequency to the storage resource on each processing element;

predicted termination time collection means for collecting predicted termination time from any processing element, the predicted termination time being time to terminate execution of at least one task assigned to the processing element;

estimated access time storage means for storing time estimated for accessing the storage resource on the processing element and time estimated for accessing the storage resource on any processing element via the network; and processing element determination means for determining which of the processing elements should execute the generated task based on the predicted termination time, the information concerning access frequency and the access time.

* * * * *